United States Patent
Griffin et al.

(10) Patent No.: US 11,972,265 B2
(45) Date of Patent: Apr. 30, 2024

(54) PARALLEL BOOTING OPERATING SYSTEM

(71) Applicant: Red Hat, Inc., Raleigh, NC (US)

(72) Inventors: Leigh Griffin, Waterford (IE);
Pierre-Yves Chibon, Paris la Defense (FR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/727,583

(22) Filed: Apr. 22, 2022

(65) Prior Publication Data

US 2023/0342162 A1    Oct. 26, 2023

(51) Int. Cl.
*G06F 9/4401*   (2018.01)
*G06F 9/30*    (2018.01)

(52) U.S. Cl.
CPC ........ *G06F 9/4406* (2013.01); *G06F 9/30123* (2013.01); *G06F 9/4411* (2013.01)

(58) Field of Classification Search
CPC ... G06F 9/4406; G06F 9/30123; G06F 9/4411
See application file for complete search history.

(56) References Cited

U.S. PATENT DOCUMENTS

| | | | |
|---|---|---|---|
| 7,032,213 B1 * | 4/2006 | Lupu | G06F 11/362 717/129 |
| 7,581,229 B2 | 8/2009 | Watkins et al. | |
| 8,082,431 B2 | 12/2011 | Rothman et al. | |
| 9,003,173 B2 | 4/2015 | Baribault et al. | |
| 9,122,551 B2 | 9/2015 | Milstead | |
| 9,235,941 B2 | 1/2016 | Ricci et al. | |
| 9,324,234 B2 | 4/2016 | Ricci et al. | |
| 9,509,868 B2 * | 11/2016 | Honma | G06F 9/4856 |
| 2006/0010433 A1 * | 1/2006 | Neil | G06F 9/45533 717/138 |

(Continued)

FOREIGN PATENT DOCUMENTS

| | | |
|---|---|---|
| CN | 100377084 C | 12/2011 |
| CN | 103777985 A | 5/2014 |

(Continued)

OTHER PUBLICATIONS https://www.embedded.com/booting-an-rtos-on-symmetric-multiprocessors/ ; "Booting an RTOS on symmetric multiprocessors", Sep. 3, 2010.

(Continued)

*Primary Examiner* — Aurel Prifti
(74) *Attorney, Agent, or Firm* — Womble Bond Dickinson (US) LLP

(57) ABSTRACT

Systems and methods providing a parallel booting operating system. In one implementation, a primary operating system is booted using a primary operating system image residing in a first disk partition. The primary operating system includes a base operating system and provides a first service. A secondary operating system is booted in parallel to the primary operating system. The secondary operating system is booted using a secondary operating system image residing in a second disk partition. The secondary operating system can include a copy of the base operating system, and can provide the first service and a second service. Responsive to a triggering event, the primary operating system is switched to the secondary operating system.

20 Claims, 5 Drawing Sheets

(56) References Cited

U.S. PATENT DOCUMENTS

| | | | | |
|---|---|---|---|---|
| 2010/0106826 A1* | 4/2010 | Sugawara | ............. | G06F 9/4416 |
| | | | | 709/224 |
| 2011/0179260 A1* | 7/2011 | Dong | .................... | G06F 9/4406 |
| | | | | 713/1 |
| 2012/0110315 A1* | 5/2012 | Lee | ...................... | G06F 9/45558 |
| | | | | 713/100 |
| 2012/0191960 A1* | 7/2012 | Piwonka | ................. | G06F 9/441 |
| | | | | 713/2 |
| 2012/0191961 A1* | 7/2012 | Wu | ......................... | G06F 9/461 |
| | | | | 711/170 |
| 2023/0342162 A1* | 10/2013 | Griffin | ................ | G06F 9/30123 |
| 2014/0115308 A1* | 4/2014 | Li | ........................... | G06F 9/485 |
| | | | | 713/1 |
| 2016/0055031 A1* | 2/2016 | Tu | ........................... | G06F 9/441 |
| | | | | 718/108 |
| 2016/0196146 A1* | 7/2016 | Wilson | ...................... | G06F 9/54 |
| | | | | 713/1 |
| 2022/0019510 A1* | 1/2022 | Renie | ................... | G06F 11/3476 |
| 2023/0230343 A1* | 7/2023 | Xu | .......................... | G06V 10/82 |
| | | | | 382/195 |
| 2023/0305867 A1* | 9/2023 | Chibon | ............... | G06F 9/45504 |

FOREIGN PATENT DOCUMENTS

| | | |
|---|---|---|
| CN | 104699489 A | 6/2015 |
| CN | 106909388 A | 6/2017 |
| CN | 111124522 B | 5/2020 |
| CN | 111381894 A | 7/2020 |
| CN | 113721989 A | 11/2021 |
| KR | 20140018134 A | 2/2014 |

OTHER PUBLICATIONS

Reznikov V., "Creating Tailored OS Images for Embedded Systems using Buildroot," Master Thesis, Universidade Jo Minho, 2019, 84 Pages.

* cited by examiner

PARALLEL BOOTING OPERATING SYSTEM

TECHNICAL FIELD

The present disclosure is generally related to operating systems, and more particularly, to parallel booting operating system.

BACKGROUND

A device's operating system manages the hardware and the software on which it is installed. An operating system can be specifically tailored to a particular device's functionality, thus limiting the uses the device can perform. Alternatively, an operating system can support a variety of functionalities. Generic operating systems can provide services for each of the functionalities supported by the operating system. For devices that subject to under booting-related restrictions (e.g., a limit on boot time), booting a generic operating system that supports multiple functionalities can be inefficient.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
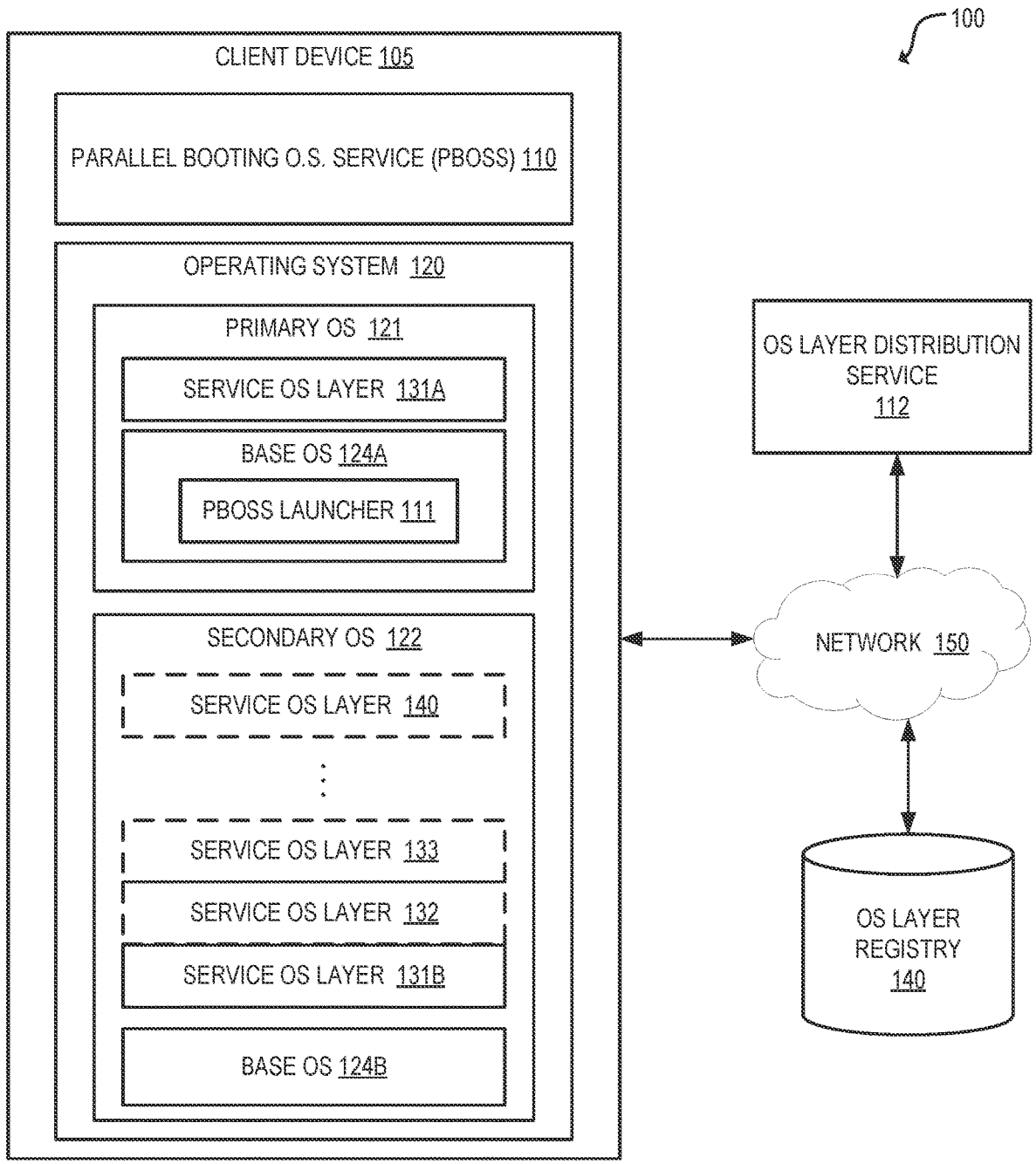
FIG. 1 depicts a block diagram of an example distributed computing system operating in accordance with one or more aspects of the present disclosure.

Implementations of the disclosure are directed to providing a parallel booting operation system. A device's operating system manages the hardware and the software on which it is installed. Herein, device refers to a computing device. A device can be, for example, an IoT device connected to a mesh network. As another example, a device can be an onboard computing device installed in a motor vehicle.

A device's operating system (OS) can employ multiple components in order to support various applications running on the device. The components of an operating system can be divided into core OS components and service OS components. The core components are the minimum components necessary to operate the device, such as, the kernel, the language stack, disk access, the system and service manager used to bootstrap user space and manager user processes, etc. The service OS components provide the services supporting the applications executable by the device. Some services can be required for the proper functioning of the device, while other services can be optional. Optional services can support additional features that are not related to the core functions of the device. For example, an operating system installed on a processing device in a motor vehicle can support required services related to the functional safety of the vehicle (e.g., the back-up camera, the radar cruise control), as well as optional services, such as those related to the infotainment system.

Some devices have booting requirements that necessitate that a specific service be operational within a specified time frame. For example, automotive requirements may specify that the back-up camera be fully functional within two seconds of starting the computing device installed in the motor vehicle. Some booting requirements can prioritize the services supporting the core functions of the device over the optional functions of the device; that is, the services supporting the core functions of the device need to be fully functional before deploying the complete operating system. As an illustrative example, a device can be a processing device installed in an Internet of Things (IoT) object, which can be part of a mesh network. The device can be an implanted glucose monitor. Based on the core function of the device (i.e., monitoring glucose levels), various services to be provided by the OS can include, e.g., joining a mesh network, retrieving configurations and/or software updates, and/or contacting neighboring devices. The booting requirements for the implanted glucose monitor can require that the service supporting the core function of the device (i.e., monitoring glucose levels) be fully functional prior to booting the additional services. For devices for which the timing can be a significant requirement, booting an all-encompassing operating system that supports all services available to the device can be inefficient. Waiting for the additional services to boot may be detrimental to the proper functioning of the device.

Aspects of the present disclosure address the above-noted and other deficiencies by introducing a parallel booting operating system service (PBOSS), which can boot two (or more) operating systems in parallel. The two operating systems can include a primary operating system and a secondary operating system. The primary operating system implements at least the core OS components, and can optionally implement service OS components, as determined by the PBOSS. A base operating system bootable image implements the core OS components necessary to operate the device, as well as the PBOSS launcher. Once launched, the PBOSS identifies which, if any, of the service OS components to include in the primary OS.

In embodiments, the PBOSS can identify the service OS components to include in the primary OS based on parameter values included in a configuration file. For example, the configuration file can include a list of the service OS components executable on the device, and each service OS component can have a flag that indicates whether the service OS component is to be included in the primary OS. As another example, the each service OS component in the list can have a corresponding priority, and the service OS components with the highest priority can be included in the primary OS. Thus, the base OS and the high priority service OS component(s) identified by the PBOSS (if any) make up the primary OS.

Each service can be supported by an operating system (OS) layer that can be installed over the base OS. An OS layer is a set of OS components (e.g., drivers, libraries, configuration files, resource usage requests, functionality priorities, user interface tasks, interrupt protocols, and/or other information specific to the corresponding functionality) that support a specific service. An OS layer can enable the execution for the corresponding service by providing an interface between the service and the base OS.

In embodiments, the OS layers can be specific to the device, and can be defined by the device manufacturer. The OS layers can be stored in a registry (either stored locally on the device, or on a centralized database). The registry can include, for example, a table that lists the OS layer corresponding to each service executable by the device, as well as the priority of the service. Based on the priority of the service, the PBOSS can identify which OS layers to include in the primary OS's bootable image. In other embodiments, a flag in the OS layer table can indicate whether an OS layer is to be included in the primary OS's bootable image. For example, the flag can indicate whether the service supported by the corresponding OS layer is required for functioning of the device. The PBOSS can create a first disk partition in which the primary OS bootable image, which includes the base OS bootable image and any identified OS layers, resides.

Once the PBOSS has identified the service OS components to include in the primary OS (if any), the PBOSS can boot the primary OS, and the device can run using the primary OS. While the device is running, supported by the primary OS, the PBOSS can create a secondary operating system image. The PBOSS can also create a second disk partition on which the secondary OS image reside. The secondary OS includes a copy of the bootable image of primary OS, and the PBOSS adds additional service OS components to the bootable image. To add the additional service OS components, the PBOSS can identify the OS layers corresponding to the service OS components, and install the identified OS layers over the copy of the primary OS. The additional service OS components added to the secondary OS bootable image can be the rest of the service OS components that support applications executable by the device. In embodiments, the PBOSS can identify the additional service OS components to add to the bootable image based on the priority of the service OS component, and/or based on the flag that indicates whether the service OS component is to be included in the primary OS.

The PBOSS can create a hard disk partition on which to boot the secondary OS. The PBOSS can disable user interaction with the services provided by the secondary OS. In embodiments, the PBOSS can reference a set of rules (e.g., in a configuration file) that dictate which OS components to allow interaction from a user, and at what times. For example, the primary OS can support the core OS components and an additional service that enables a security feature. The security feature can be, for example, verifying a username and password combination prior to enabling a user to use the device. The PBOSS can launch the primary OS, which will boot the device and execute the request user authentication service. While the device is running supported by the primary OS, the PBOSS can create a secondary OS image that includes a copy of the primary OS bootable image plus the service OS components that provide the services supporting the applications executable by the device. The PBOSS can launch the secondary OS bootable image residing in the second disk partition. However, until a user provides a correct username and password combination, the PBOSS restricts any user interaction with second disk partition. Thus, a user of the device cannot gain access to the services provided by the secondary OS by circumventing the security feature. Once the security feature parameters has been satisfied (i.e., receiving a valid username and password combination), the PBOSS can transfer operation of the device to the secondary OS.

To determine when to transfer operation of the device to the secondary OS, the primary OS can have an associated time limit, and/or can have service-related execution requirements. For example, the primary OS can have an associated timeout triggered by the boot process, upon expiration of which the PBOSS can transfer operation of the device to the secondary OS. As another example, the primary OS can include a security-related service, e.g., user authentication. Once the security-related service has performed its function (e.g., has received a valid username and password combination), the PBOSS can determine that the execution requirements of the primary OS have been met. For example, the PBOSS can receive a notification from the security-related service provided by the primary OS, notifying the PBOSS that the execution requirements of the primary OS have been met. Once the PBOSS has determined that the primary OS has satisfied its service-related execution requirement, the PBOSS can consolidate the two operating systems and transfer operation from the primary OS to the secondary OS. In some embodiments, the primary OS can have both a time limit and a service-related execution requirement.

To transfer operation of the device from the primary OS to the secondary OS, the PBOSS can implement a failover mechanism. In embodiments, the PBOSS can copy any data that has been stored by the primary OS to the hard disk partition in which the secondary OS resides. Additionally, the PBOSS can act as a proxy for an ongoing connections between running applications and the device hardware. The PBOSS can identify running services supported by the primary OS, and reroute them to the secondary OS. In embodiments, the PBOSS can deploy the primary OS and the secondary OS using an A/B deployment strategy, in which a configuration file in the PBOSS specifies which services are supported by the primary OS and which are supported by the secondary OS. To transfer operation from the primary OS to the secondary OS, the PBOSS can update the A/B deployment configuration, in which A represents the primary OS, and B represents the secondary OS. Updating the A/B deployment configuration can result in automatically rerouting to B any requests directed to A. In some embodiments, the PBOSS transfers operation from the primary OS to the secondary OS using process duplication, or using parent child processes. Other mechanisms to transfer operation of the device from the primary OS to the secondary OS may be used. Thus, the failover mechanism offloads, to the secondary OS, client requests, thread contexts, data items, metadata items, software modules, and/or other tasks being executed by the primary operating system. Since the secondary OS includes a copy of the primary OS bootable image, the core OS components already exist in the secondary OS. Once the transfer is complete, the device is supported by the secondary OS. The PBOSS can release the resources (e.g., CPU, RAM, and/or storage space) used by the primary operating system.

The PBOSS boots the primary OS first, and continues to boot the secondary OS while the device is operational. In embodiments, the PBOSS can add OS layers to the primary OS prior to switching from the primary OS to the secondary OS. For example, the service running on the primary OS can provide the first step in a multi-step authentication process. The service-related execution requirement can be satisfied by receiving a valid username and password combination. At the satisfaction of the service-related execution requirement, the PBOSS can add a second service to the primary OS. The second service can provide the second step in the multi-step authentication process (e.g., a biometric screening). The second service-related execution requirement can be receiving a valid biometric authentication. After receiving a valid biometric authentication, the PBOSS can then transfer operation of the device from the primary OS to the secondary OS.

In embodiments, the PBOSS can use the secondary OS to configure and/or test an OS layer prior to installing the OS layer on the primary OS. For example, prior to installing the OS layer on the primary OS, the PBOSS can retrieve configuration files for the OS layer. The configuration files for the OS layer can include OS layer customizations and testing protocols, which the PBOSS can execute in the partition in which the secondary OS operates. Once the OS layer has satisfied the testing requirements, the PBOSS can deploy and the install the OS layer on the primary OS. Using the resources of the secondary OS to configure and test before deploying OS layers in the primary OS enables redundancy in the event that the OS layers malfunction. That is, the primary OS can remain fully functioning while the PBOSS configures and tests OS layers in the secondary OS.

Aspects of the present disclosure present advantages, including but not limited to, booting an operating system that reliably satisfies the booting requirements of the device. The partition separating the primary OS from the secondary OS enables for maximum security for the device by exposing the bare minimum functionality of the device to the user. For example, the primary OS can be limited to supporting the functionality of receiving user input from a keyboard until it has received a valid username and password combination. The PBOSS can then add an OS layer to support the functioning of the camera in order to perform a face recognition authentication. Thus, the primary OS is then limited to supporting user input from the keyboard and the camera. User access to the other functions of the device is disabled until both security features have been satisfied. That is, a user is barred from interacting with the functions of the device supported by the secondary OS. However, since the secondary OS is booted while the primary OS is supporting operation of the device, once the security features have been satisfied the PBOSS can immediately consolidate the operating systems. Switching to the secondary OS can be near instantaneous. Thus, the time elapsed while waiting for the rest of the OS to boot after providing security information is avoided. Additionally, by consolidating the primary and secondary operating systems and releasing resources consumed by the primary OS, the resulting OS has a minimal footprint on the device. Furthermore, by using the secondary OS space to test and configure OS layers prior to installing them in the primary OS, aspects of the present disclosure enable enhanced testing, redundancy, and recovery mechanisms.

FIG. 1 is a block diagram of a distributed computing system 100, in which embodiments of the present disclosure may operate. One skilled in the art will appreciate that other architectures are possible, and that the implementation of a computer system utilizing examples of the invention are not necessarily limited to the specific architecture depicted by FIG. 1.

The distributed computing system 100 includes a client device 105 connected, via a network 150, to an OS layer distribution service 112, and/or an OS layer registry 140. The client device 105 can include one or more processing devices communicatively coupled to memory devices and input/output devices. The client device 105 can be a laptop computer, a tablet computer, a mobile phone (e.g., a smartphone), a computing device installed in motor vehicle, in an IoT object, as a part of a mesh network, or any suitable computing device. The OS layer distribution service 112 can include one or more computing devices, e.g., server computer systems. In embodiments, the OS layer registry 140 can be stored on the OS layer distribution service 112 computing device. In embodiments, the OS layer registry 140 and/or the OS layer distribution service 112 can be installed on the client device 105. Each computing device (e.g., the client device 105 and/or the OS layer distribution service 112) can include additional resources not pictured in FIG. 1, such as one or more central processing units (CPU), main memory, which may include volatile memory devices (e.g., random access memory (RAM)), non-volatile memory devices (e.g., flash memory) and/or other types of memory devices, a storage device (e.g., one or more magnetic hard disk drives, a Peripheral Component Interconnect (PCI) solid state drive, a Redundant Array of Independent Disks (RAID) system, a network attached storage (NAS) array, etc.), and one or more devices (e.g., a Peripheral Component Interconnect (PCI) device, network interface controller (NIC), a video card, an input/output device, etc.). In certain implementations, the main memory may be non-uniform access (NUMA), such that memory access time depends on the memory location relative to CPU.

In embodiments, the OS layer registry 140 can be a centrally-located database. In embodiments, the OS layer registry 140 can be a database that stores one or more service OS layers corresponding to the services that support the various applications executable on the client device 105. Each service OS layer can include a set of OS components, including but not limited e.g., drivers, libraries, configuration files, resource usage requests, functionality priorities, user interface tasks, and/or interrupt protocols. The PBOSS 110 and/or the OS layer distribution service 112 can access the OS layer registry 140 to retrieve a service OS layer corresponding to a specific service. The OS layers in the OS layer registry 140 can be defined by the device manufacturer, and can be maintained, for example, by the OS layer distribution service 112. In embodiments, the OS layer distribution service 112 can implement updates to the OS layers in the OS layer registry 140, and can distribute updated OS layers in the OS layer registry 140 to client device 105.

The OS layer distribution service 112 can communicate with the client device 105 via an API, or other type of specified interface having operations that OS layer distribution service 112 can use to transmit OS layers to the client device 105. The OS layer distribution service 112 can facilitate the distribution of the service OS layers stored in OS layer registry 140. The OS layer distribution service 112 can maintain the OS layer registry 140, including ensuring the OS layers are updated and functional. The OS layer distribution service 112 can receive requests from a client device 105 (via PBOSS 110), and responsive to the request, can transmit the requested OS layer to the client device 105.

The network 150 can be a private network (e.g., a local area network (LAN), a wide area network (WAN), intranet, etc.) or a public network (e.g., the Internet). In one example, the network 150 can include a wired or a wireless infrastructure, which can be provided by one or more wireless communications systems, such as a wireless fidelity (WiFi) hotspot connected with the network and/or a wireless carrier system that can be implemented using various data processing equipment, communication towers, etc. The client device 105 can receive data via network 150 using an API, for example.

The client device 105 can include a parallel booting operating system service (PBOSS) 110 and an operating system 120. The operating system 120 can include a primary OS 121 and a secondary OS 122. The primary OS can include a base OS 124A, and optionally can include one or more service OS layers 131A. The base OS 124A can be a standalone OS and can include the minimum components necessary to operate the client device 105. The base OS 124 can include a PBOSS launcher 111. The PBOSS launcher 111 can launch the PBOSS 110. Once launched, the PBOSS 110 can manage the service OS layers 131140 within operating system 120.

The PBOSS 110 can identify which service OS layer(s) to include in the primary OS 121 bootable image, in addition to the base OS 124. The PBOSS 110 can identify any number of service OS layers to boot with the base OS 124; in embodiments, the PBOSS 110 can identify no service OS layers to boot with the base OS 124. As an illustrative example in FIG. 1, PBOSS 110 can identify one service OS layer 131A to boot with the base OS 124. To identify which (if any) of the service OS layers to boot with the base OS 124, the PBOSS 110 can identify an indicator (e.g., a flag, or a priority) that is associated with the service OS layer 131A. The indicator can indicate to the PBOSS to add the corresponding service OS layer 131A to the primary OS. For example, the PBOSS can determine to add the service OS layer 131A to the primary OS that has an corresponding priority of "1," or a flag value set to "0." The base OS 124 and the service OS layer 131A make up the primary OS 121. The client device 105 can operate using the primary OS 121, and user access to the primary OS 121 is enabled (i.e., a user of the client device 105 may interact with the services provided by the primary OS 121).

The PBOSS 110 can create a partition on the hard disk on which the OS 120 is running. The PBOSS 110 can install the secondary OS 122 bootable image on the partition. The secondary OS 122 can include a copy of the primary OS bootable image (i.e., including the base OS 124B and the service OS layer 131B). While the client device 105 is operating supported by the primary OS 121, the PBOSS 110 can install additional service OS layers 132-140 in the secondary OS. The secondary OS 122 can include any number of service OS layers 132-140. The PBOSS 110 can receive the service OS layers 131-140 from OS layer distribution 112. The service OS layers 131-140 can be the service OS layers that support various applications executable by the client device 105, according to the informational data stored in OS layer registry 140. For example, the data stored in OS layer registry 140 can include a field indicating which OS layer(s) are available to the client device 105, and PBOSS 110 can install the OS layer(s) available to client device 105 in the secondary OS 122. As another example, the PBOSS 110 can include a configuration file that lists the OS layer(s) to include in the primary OS 121 and/or in the secondary OS 122. In embodiments, the service OS layers 131-140 installed in OS 120 can be identified based on user input (e.g., user requests received via a user interface of client device 105).

The PBOSS 110 can detect, intercept, or otherwise receive notification of a triggering event. The triggering event can be receiving a user request, receiving a network notification, satisfying a condition of the first service, an expiration of a defined time period, or detection of a presence of another device (e.g., a smartphone or smart watch connected to the device, e.g., via Bluetooth). For example, the triggering event can be a user initiated request, such as a user selecting executing of a particular service via a user interface.

In embodiments, the triggering event can cause the PBOSS 110 to consolidate the primary OS 121 and the secondary OS 122 by switching operation of the client device 105 from the primary OS 121 to the secondary OS 122. Switching operation of the client device 105 from the primary OS 121 to the secondary OS 122 involves offloading, to the secondary OS, client requests, thread contexts, data items, metadata items, software modules, and/or other tasks associated with the primary operating system. Switching operation of the client device 105 from the primary OS 121 to the secondary OS 122 is further described with respect of FIG. 2.

In embodiments, the triggering event can cause the PBOSS 110 to add a service OS layer to the primary OS 121, or to create an additional OS partition. For example, the PBOSS 110 can create a tertiary OS that includes a copy of the primary OS 121 bootable image or a copy of the secondary OS 122 bootable image, along with additional service OS layers. Responsive to a correlated triggering event, the PBOSS 110 can then switch from the secondary OS 122 to the tertiary OS. In embodiments, the triggering event can cause the PBOSS 110 to add a service OS layer 131-140 to primary OS 121 and/or to secondary OS 122. Adding a service OS layer 131-140 to the primary OS 121 includes installing the corresponding OS layer over the base OS 124.

In embodiments, the PBOSS 110 can store a list of triggering events and their corresponding actions and correlated services. The PBOSS 110 can identify, in the list, the service corresponding to the detected triggering event. In embodiments, the PBOSS 110 can send a request to OS layer distribution service 112, requesting the OS layer corresponding to the identified service. The PBOSS 110 can then add or update the OS layer received from the OS distribution service 112, according to the triggering event. In some embodiments, the OS layer may be stored locally on client device 105, in which case the OS layer manager 110 can install or update the OS layer corresponding to the identified service. In some embodiments, the triggering event triggers the removal of a functionality, in which the PBOSS 110 can remove the service OS layer 131-140 corresponding to the identified service.

Figure 2:
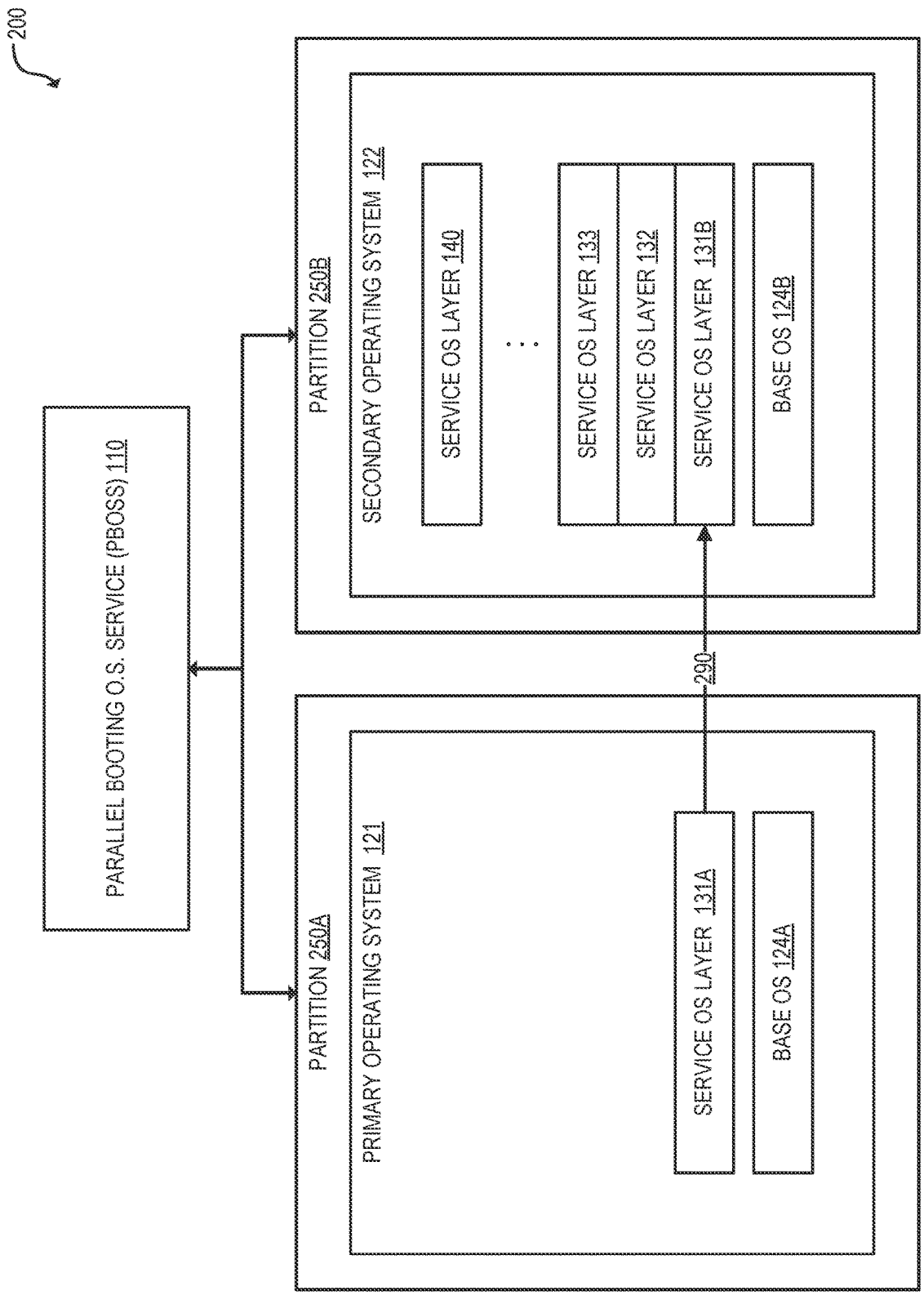
FIG. 2 depicts a block diagram of an parallel booting operating system service (POBSS) operating in accordance with one or more aspects of the present disclosure.

FIG. 2 depicts an example parallel booting operating system service (POBSS) 110 implementing parallel operating systems operating in accordance with one or more aspects of the present disclosure. PBOSS 110 can create two separate partitions 250A-B in which to boot two operating systems 121, 122. Operating systems 121, 122 can represent OS bootable images. As described above, a base OS can launch the PBOSS 110. Once launched, the PBOSS 110 can create a partition 250A, and install the primary OS 121 in the partition 250A. The primary OS 121 can include the base OS 124A, and optionally one or more service OS layers. FIG. 2 illustrates a single service OS layer 131A included in the primary OS 121. To determine which OS layer 131A to add to the primary OS, the PBOSS 110 can include a configuration file that includes a list of OS layers to include in the primary OS 121. The configuration file can include, for example, a list of OS layers available to the device, and the list can indicate which of the OS layers has primary OS priority. The configuration file can include multiple priorities for the OS layers, and the PBOSS 110 can in turn add OS layers to the primary OS 121 according each priority. For example, the OS layers with the highest priority can be added to primary OS 121 first, and after a specified time frame (e.g., specified in the configuration file), the PBOSS 110 can add OS layers with the second highest priority to the primary OS 121. In some embodiments, rather than add the OS layers with the second highest priority to the primary OS 121, the PBOSS 110 can boot the secondary OS 122 to include a copy of the primary OS 121 as well as the OS layers with the second highest priority. The PBOSS 110 can then boot a tertiary OS (not pictured) to include all other OS layers available to the device.

The PBOSS 110 can create a second partition 250B. The PBOSS 110 can generate a secondary OS 122 on the second partition 250B. The secondary OS 122 can include a copy of the primary OS 121 bootable image, including a copy of the base OS 124B bootable image and a copy of the service OS layer 131B. While the client device is running primary OS 121, the PBOSS can continue to generate the secondary OS 122 bootable image by adding additional service OA layers 132-140, and can deploy the secondary OS 122 bootable image in partition 250B.

A triggering event can cause the PBOSS 110 to switch from the primary OS 121 to the secondary OS 122. Since the base OS 124 and the priority service OS layer(s) 131 already exist in the secondary OS 122, switching from the primary OS 121 to the secondary OS 122 can include transitioning the running service (i.e., supported by base OS 124A and service OS layer 131A) to the secondary OS 122. The transition 290 can include rerouting, to the secondary OS 122, process connections, client requests, thread contexts, data items, metadata items, software modules, and/or other tasks associated with the primary operating system. Because PBOSS 110 has access to both partitions 250A-B, PBOSS 110 can act as a proxy with respect of ongoing connections during the transition 290 from primary OS 121 to secondary OS 122. After switching to the secondary OS 122, the PBOSS 110 can delete the partition 250A and release the resources used by the operation of primary OS 121. The device is then supported by a single OS, namely secondary OS 122.

As an illustrative example, the client device 105 can be an onboard computing device installed in a motor vehicle. The base OS 124A can launch the PBOSS 110. Once launched, the PBOSS 110 can add service OS layer 131A to the primary OS 121. The service OS layer 131A can support the execution of the back-up camera in the motor vehicle, for example. Primary OS 121 can boot in the regulatory required timeframe, e.g. within 2 seconds after power on. In parallel to booting the primary OS 121, the PBOSS can create a partition 250B and boot the secondary OS 122. The PBOSS 110 can install service OS layers 132-140 to the secondary OS 122. The PBOSS 110 can detect a triggering event, such as a time based gate (e.g., 10 seconds after power on). After detecting the triggering event (i.e., 10 seconds after powering on), the PBOSS 110 can transfer operation from the primary OS 121 to the secondary OS 122.

Figure 3:
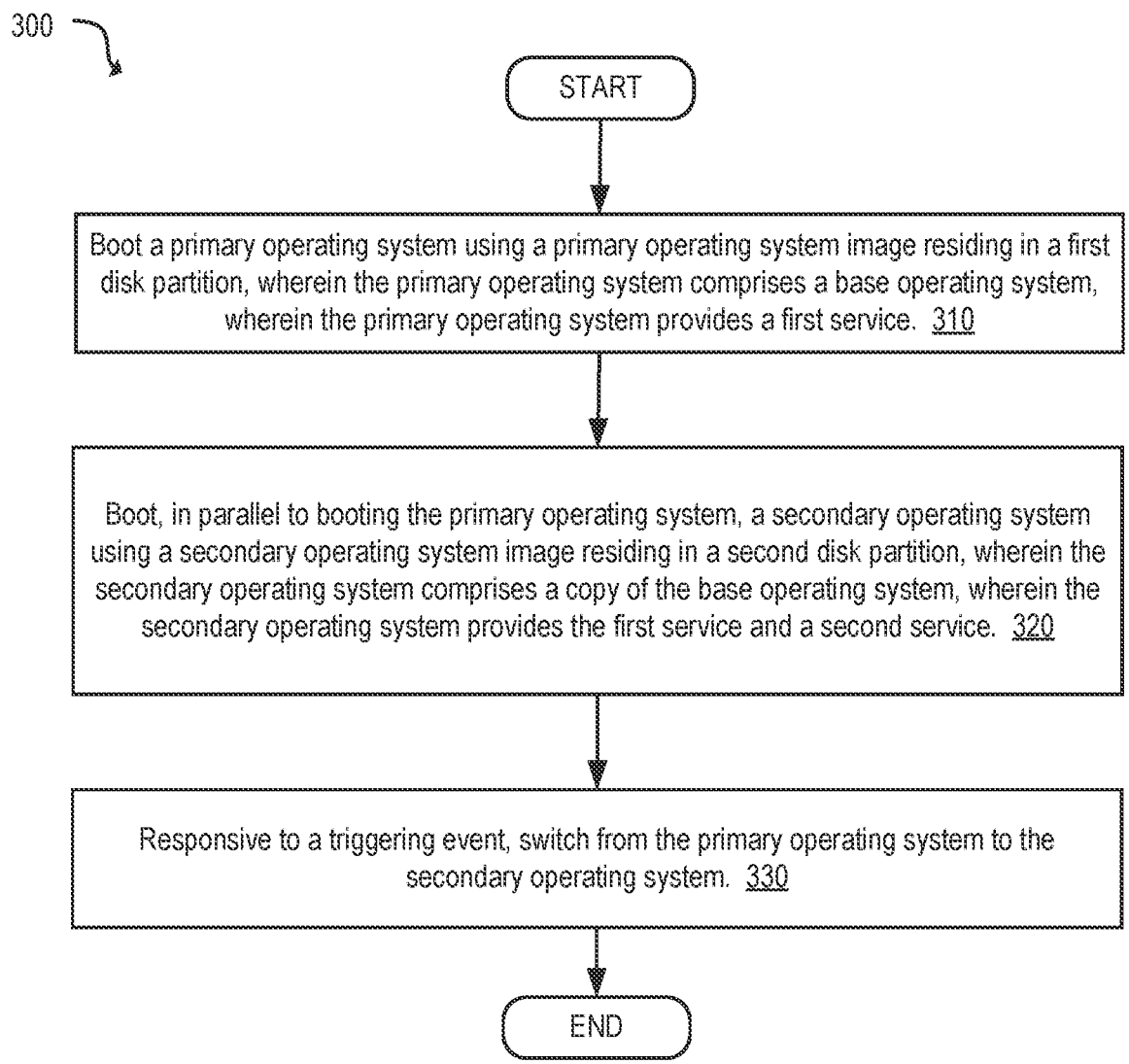
FIG. 3 is a flow diagram of an example method for implementing a parallel booting operating system, in accordance with one or more aspects of the present disclosure.

FIG. 3 depicts a flow diagram of an example method 300 for implementing a parallel booting operating system, in accordance with one or more aspects of the present disclosure. Method 300 may be performed by processing logic (e.g., in client device 105 of FIG. 1) that may comprise hardware (e.g., circuitry, dedicated logic, programmable logic, microcode, etc.), software (such as instructions run on a processing device), firmware, or a combination thereof. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). In one embodiment, method 300 may be performed by PBOSS 110 of FIG. 1.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 310, processing logic can boot, using a primary operating system residing in a first disk partition, a primary operating system. The primary operating system includes a base OS. The base operating system can include the minimum components necessary to operate the device. The base operating system can be a standalone operating system provided by an OS provider, and can include, for example, the kernel, the language stack, a system and service manager used to bootstrap user space and manager user processes, etc. The primary OS can provide a first service. In embodiments, the first service can enable a function related to the core function of the device on which the primary OS is running. In some embodiments, the first service can enable a security-related function of the device, such as a functional safety function (e.g., a back-up camera on a motor vehicle), or a login authentication service (e.g., a username and password combination on a laptop). The client device runs using the primary OS.

Processing logic can create a first hard disk partition on which to install the primary OS. User access to the first hard disk partition can be enabled. That is, the user can access the first service provided by the primary OS. In embodiments, processing logic can reference a set of rules (e.g., in a configuration file) to determine which user interactions to enable.

To provide the first service, the processing logic can install, over the base OS, a first OS layer corresponding to the first service. The first OS layer includes operating system components that provide the first service, such as a driver, a configuration file, a priority, an interrupt protocol, and/or a user interface task. In embodiments, processing logic can identify the first service provided by the primary OS based on a priority of the first service. Processing logic can identify a priority for each service available to the device. The priorities can be identified based on determined data (e.g., each service can have preset priority defined by the device manufacturer in the OS layer registry). For example, the device manufacturer can define that the rear-view back-up camera functionality takes priority over the infotainment functionality by assigning a higher priority to the OS layer(s) that supports executing of the rear-view back-up camera. In embodiments, processing logic can identify a flag for each service available to the device (e.g., as defined in the OS layer registry). The first service provided by the primary OS can be identified based on a flag. For instance, a value of "0" can indicate that the corresponding service is to be included in the primary OS.

At block 320, processing logic can boot, in parallel to booting the primary OS, a secondary OS using a secondary operating system image residing in a second disk partition. The secondary OS can include a copy of the primary OS bootable image. The secondary OS can provide the first service and a second service. To provide the second service, processing logic can identify the OS layer corresponding to the second service, and install the identified OS layer over the primary OS bootable image. The second service can be identified based on the flag and/or the priority of the service. In embodiments, the secondary OS can include all services available to the device. Processing logic can create a second hard disk partition on which to install the secondary OS. User access to the second hard disk partition can be disabled. That is, a user is restricted from accessing the services provided by the secondary operating system. In embodiments, processing logic can reference a set of rules (e.g., in a configuration file) to determine which user interactions to restrict.

At block 330, responsive to a triggering event, processing logic can switch from the primary OS to the secondary OS. The triggering event can be receiving a user request, receiving a network notification, satisfying a condition of the first service (e.g., first service lifecycle event), an expiration of a defined time period, or detection of a presence of another device (e.g., a smartphone or smart watch connected to the device, e.g., via Bluetooth). For example, the triggering event can be satisfying a condition of the first service, such as receiving a valid username and password combination.

Switching from the primary OS to the secondary OS can include offloading, to the secondary operating system, at least one of a client request, a thread context, a data item, a metadata item, a software module, or a task executed by the primary operating system. Processing logic can enable user access to the services provided by the secondary operating system, and stop operation of the primary operation system. After switching to the secondary operating system, processing logic can release the resources (e.g., CPU, RAM, and/or storage space) consumed by the primary operating system. The secondary operating system thus becomes the sole operating system running on the device.

In embodiments, processing logic can receive a triggering event that triggers the addition of a service to the primary operating system before switching from the primary OS to the secondary OS. The triggering event can be, for example, a user request, a network notification, satisfying a condition of the first service, an expiration of a defined time period, or detection of a presence of another device. For example, the first service provided by the primary OS can verify the user's username and password. The triggering event can be confirmation that the username and password combination is correct, thus satisfying the condition of the first service. In response to the triggering event (i.e., receiving a notification that the received username and password combination is correct), processing logic can provide an additional service to the primary OS by installing, over the base OS, an OS layer corresponding to the additional service. The added service can be, for example, a facial recognition screening service used for device access security. The service OS layer added to the primary OS can include OS layers to enable the camera feature of the device, as well as the facial recognition application. Then, in response to another triggering event (e.g., verification from the facial recognition application), processing logic can switch operation from the primary OS to the secondary OS.

Figure 4:
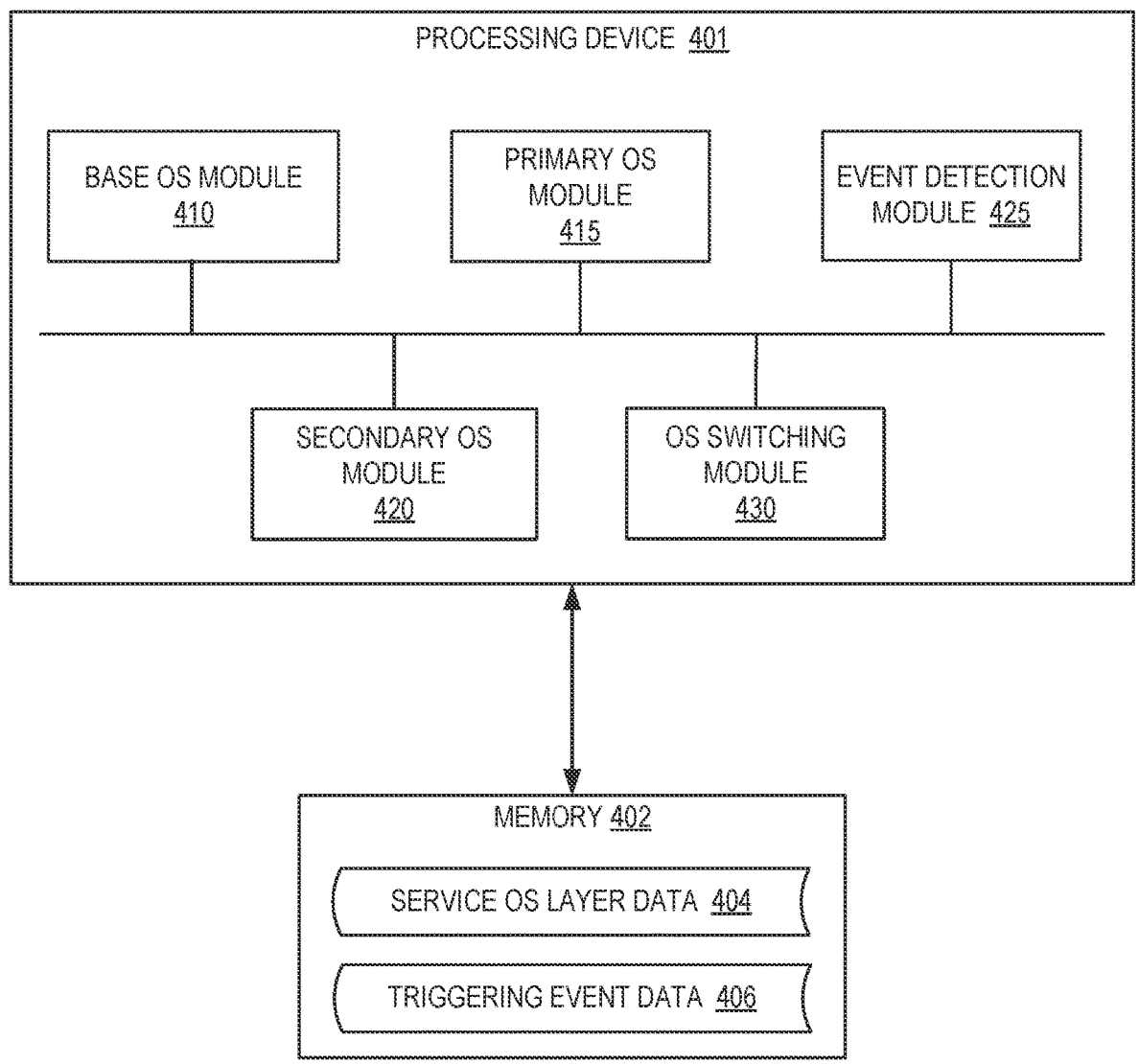
FIG. 4 depicts a block diagram of an example computer system operating in accordance with one or more aspects of the present disclosure.

FIG. 4 depicts a block diagram of a computer system 400, operating in accordance with one or more aspects of the present disclosure. Computer system 400 may be the same or similar to client device 105 of FIG. 1. Examples of the client device 105 include, but are not limited to, a processing device installed in a communication device, in a motor vehicle, a processing device installed in an IoT object (e.g., a wearable smart watch, a thermostat, etc.), a processing device installed in an object that is part of a mesh network, a processing device installed in an implanted device, a processing device installed in laptop computer, a processing device installed in a tablet computer, a processing device installed in a mobile phone (e.g., a smartphone), or any other appropriate processing device. Computer system 400 may include a base OS module 410, a primary OS module 415, a secondary OS module 420, an event detection 425, and/or an OS switching module 430. Computer system 400 can also include a memory 402 that can store service OS layer data 404 and/or triggering event data 406.

In embodiments, the base OS module 410 may enable a processor to boot a computing device (e.g., client device 105 of FIG. 1) using the base operating system provided by an OS provider. The base OS can be a standalone OS that includes the minimum components required to operate the computing device. The base OS can include, for example, the kernel, the language stack, and the system and service manager used to bootstrap user space and manage user processes. The base OS can instructions to launch the PBOSS, which can in turn implement the primary OS module 415, the secondary OS module 420, the event detection module 425, and the OS switching module 430.

The primary OS module 415 may enable a processor to create a primary OS bootable image that includes the base OS as well as one or more additional service OS layer. The primary OS module 415 can identify the service OS layer(s) to add to the primary OS based on service OS layer data 404. The service OS layer data 404 can include a list of the services available to the device, along with a flag associated with each service indicating whether the service is to be provided by the primary OS. The primary OS module 415 can identify the services to be provided by the primary OS (e.g., based on the flag), and can install the OS layer corresponding to the identified services to the primary OS. In embodiments, the service OS layer data 404 can include a priority for each service in the list of services available to the device, and the primary OS module 415 can determine which service OS layer(s) to include in the primary OS based on the priority of each service. For example, a priority value of "1" can indicate to the primary OS module 45 to include the corresponding service OS layer in the primary OS. The primary OS module 415 can create a first disk partition, in which the primary OS bootable image resides (such as partition 250A of FIG. 2).

The secondary OS module 420 can create a second disk partition in a secondary OS bootable image resides (such as partition 250B of FIG. 2). The secondary OS module 420 can boot the secondary OS in the second disk partition. The secondary OS can include a copy of the primary OS bootable image as well as any other service OS layers. The secondary OS layer module 420 can identify service OS layer(s) to add to the secondary OS based on service OS layer data 404. For example, the secondary OS module 420 can identify the services available to the device for which the corresponding flag does not indicate that the associated service is to be provided by the primary OS. As another example, the service OS layer data 404 can include an indicator (e.g., a priority) associated each service indicating whether the associated service is to be provided by the secondary OS. In embodiments, the secondary OS module 420 may enable a processor to install, configure, and test an OS layer in the secondary OS prior to installing the OS layer in primary OS.

Creating the first and/or second disk partitions can include allocating a portion of the hard drive on which to segregate the secondary OS. The primary OS and the secondary OS have distinct and separate interface requirements, thus preventing cross-communication. For example, tasks operating on the primary OS are prevented from accessing the secondary OS, and vice versa.

The triggering event detection module 420 may enable a processor to detect triggering events. A triggering event can be a user request, a network notification, satisfaction of a condition specified by a service, an expiration of a specified time period, and/or a detection of the presence of another device (e.g., within a mesh network). It should be appreciated that other triggering events are envisioned. Detection of a triggering event can trigger the addition of functionality to the primary OS, or can trigger the switch from the primary OS to the secondary OS. For example, the first service provided by the primary OS can be a security service, and the event detection module 420 may receive user input provided via a user interface. The user input can be, for example, a valid username and password combination. Receiving the valid username and password combination may trigger a condition associated with the first service, which may lead to switching from the primary OS to the secondary OS. As another example, receiving a valid username and password combination may trigger the addition of a second service to the primary OS. The second service can enable a second verification in a multi-step user authentication, such as a biometric authentication. As another example, the event detection module 420 may detect that a defined time period has elapsed since the primary OS was booted (e.g., 30 seconds), which may trigger the switch from the primary OS to the secondary OS.

In embodiments, a list of triggering events may be stored in memory 402 as triggering event data 406. The triggering event data 406 can correlate events with corresponding actions. The triggering event data 406 can list events corresponding to the services supporting the various applications executable by the device, along with the action to take responsive to detecting the event. For example, the triggering event data 406 can include a table, and each entry of the table can list a triggering event, the associated service, and the action or actions to take responsive to detecting the triggering event. As an illustrative example, an entry in the table can include a triggering event for receiving a valid username and password combination from a first authentication service, and the associated action can be to add the second authentication service to the primary OS. Another entry can include a triggering event for receiving a valid biometric authentication from the second authentication service, and the associated action can be to switch operation from the primary OS to the secondary OS. In embodiments, the triggering event can be launching the base OS, and the associated action can be add a first service to the primary OS.

In some embodiments, the event detection module 420 may detect, as a triggering event, the presence of a correlated second device. For example, the client device 105 can be a processing device installed on a car's computer system, and the presence of a smart phone connected to client device 105 (e.g., via Bluetooth®) can be a triggering event detected by event detection module 215. Such a triggering event may trigger a multi-step authentication factor, and may trigger switching the operation from the primary OS to the secondary OS. As another example, the detection of a correlated second device may trigger the addition of a service to the primary OS, such as adding the device to a mesh network.

The OS switching module 430 may enable a processor to switch from the primary OS to the secondary OS. Switching from the primary OS to the secondary OS can include transferring stored data generated by the primary OS to the secondary OS, or alternatively, enabling the secondary OS to access the data stored by the primary OS. Because the primary OS and the secondary OS share a common layer (i.e., the base OS), transferring data access from the primary OS to the secondary OS is seamless. The base OS included in the secondary OS is a copy of the base OS included in the primary OS. Switching from the primary OS to the secondary OS can also include routing, to the secondary OS, client requests, thread contexts, data items, metadata items, software modules, and/or other tasks executed by the primary operating system.

After switching operation to the secondary OS, the OS switching module 430 may enable a processor to delete the primary OS, and release the resources used by the primary OS. That is, the primary OS is no longer needed, and the device is fully supported by the secondary OS. Thus, the OS switching module 430 can stop execution of the primary OS and releases the resources supporting execution of the primary OS.

Figure 5:
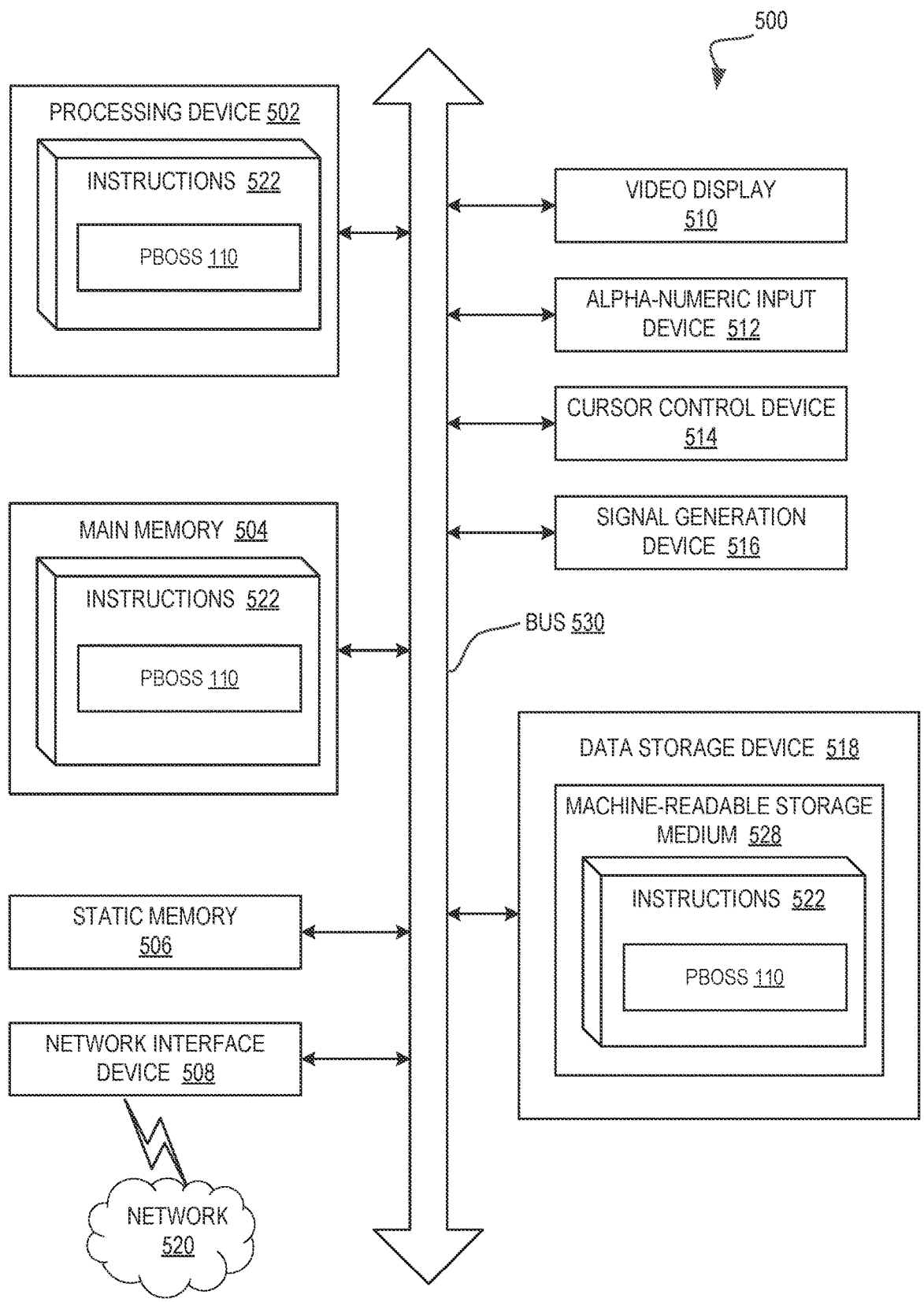
FIG. 5 depicts a block diagram of an illustrative computer system operating in accordance with one or more aspects of the present disclosure.

FIG. 5 is a diagrammatic representation of a machine in the exemplary form of a computer system 500 within which a set of instructions for causing the machine to perform any one or more of the methodologies discussed herein may be executed. In various illustrative examples, computer system 500 may correspond to client device 105 of FIG. 1 and/or computer system 400 of FIG. 4. Computer system 500 may be included within a data center that supports virtualization. Virtualization within a data center results in a physical system being virtualized using virtual machines to consolidate the data center infrastructure and increase operational efficiencies. A VM may be a program-based emulation of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain embodiments, computer system 500 may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. Computer system 500 may be provided by a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that device. Further, while only a single machine is illustrated, the term "computer" shall also be taken to include any collection of computers that individually or jointly execute a set (or multiple sets) of instructions to perform any one or more of the methodologies discussed herein.

The example computer system 500 may include a processing device 502, a main memory 504 (e.g., read-only memory (ROM), flash memory, dynamic random access memory (DRAM) (such as synchronous DRAM (SDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 502 may also be one or more special-purpose processing devices such as an application specific integrated circuit (ASIC), a field programmable gate array (FPGA), a digital signal processor (DSP), network processor, or the like. Processing device 502 may be configured to execute PBOSS 110 for programming the operations and steps discussed herein.

Computer system 500 may further include a network interface device 508. Computer system 500 may also include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 520 having one or more sets of instructions (e.g., PBOSS 110) embodying any one or more of the methodologies of functions described herein. The PBOSS 110 may also reside, completely or at least partially, within main memory 504 and/or within processing device 502 during execution thereof by computer system 500; main memory 504 and processing device 502 also constituting machine-readable storage media. PBOSS 110 may further be transmitted or received over a network 526 via network interface device 508.

Machine-readable storage medium 520 may also be used to store the device queue manner logic persistently. While machine readable storage medium 520 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling," "transmitting," "requesting," "identifying," "querying," "retrieving," "forwarding," "determining," "passing," "processing," "issuing," "measuring," "caching," "monitoring," mapping," "estimating," "calculating," "disabling," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required method 300, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
booting, by a processing device of a first device, a primary operating system using a primary operating system image residing in a first disk partition, wherein the primary operating system comprises a base operating system, wherein the primary operating system provides a first service;
booting, in parallel to booting the primary operating system, a secondary operating system using a secondary operating system image residing in a second disk partition, wherein the secondary operating system comprises a copy of the base operating system, wherein the secondary operating system provides the first service and a second service; and
responsive to a detection of at least one triggering event of a set of triggering events, switching from the primary operating system to the secondary operating system, wherein the set of triggering events comprises at least one of: satisfying a condition associated with the first service provided by the primary operating system and the secondary operating system, or detection of a presence on a network of a second device, wherein the first device is connected to the network.

2. The method of claim 1, wherein switching from the primary operating system to the secondary operating system comprises:
offloading, to the secondary operating system, at least one of: a client request, a thread context, a data item, a metadata item, a software module, or a task associated with the primary operating system;
enabling user access to the first service and to the second service provided by the secondary operating system; and
stopping operation of the primary operating system.

3. The method of claim 1, further comprising:
responsive to switching from the primary operating system to the secondary operating system, releasing one or more resources associated with the primary operating system.

4. The method of claim 1, further comprising:
responsive to a second triggering event, providing a third service by the primary operating system before switching from the primary operating system to the secondary operating system.

5. The method of claim 1, wherein the first service is identified based on at least one of: a priority associated with the first service or a flag associated with the first service.

6. The method of claim 1, wherein providing the first service comprises installing, over the base operating system, a first operating system layer corresponding to the first service, wherein the first operating system layer comprises operating system components associated with the first service, wherein the operating system components comprise at least one of: a driver, a configuration file, a priority, an interrupt protocol, or a user interface task.

7. The method of claim 1, wherein the set of triggering events further comprises at least one of: receiving a user request, receiving a network notification, or an expiration of a defined time period.

8. A system comprising:
a memory; and
a processing device of a first device operatively coupled to the memory, the processing device to:
boot a primary operating system using a primary operating system image residing in a first disk partition, wherein the primary operating system comprises a base operating system, wherein the primary operating system provides a first service;
boot, in parallel to booting the primary operating system, a secondary operating system using a secondary operating system image residing in a second disk partition, wherein the secondary operating system comprises a copy of the base operating system, wherein the secondary operating system provides the first service and a second service; and
responsive to a detection of at least one triggering event of a set of triggering events, switch from the primary operating system to the secondary operating system, wherein the set of triggering events comprises at least one of: satisfying a condition associated with the first service provided by the primary operating system and the secondary operating system, or detection of a presence on a network of a second device, wherein the first device is connected to the network.

9. The system of claim 8, wherein to switch from the primary operating system to the secondary operating system, the processing device is further to:
offload, to the secondary operating system, at least one of: a client request, a thread context, a data item, a metadata item, a software module, or a task associated with the primary operating system;
enable user access to the first service and to the second service provided by the secondary operating system;
stop operation of the primary operating system; and
release one or more resources associated with the primary operating system.

10. The system of claim 8, wherein the processing device is further to:
responsive to a second triggering event, providing a third service by the primary operating system before switching from the primary operating system to the secondary operating system.

11. The system of claim 8, wherein the first service is identified based on at least one of: a priority associated with the first service or a flag associated with the first service.

12. The system of claim 8, wherein providing for the first service comprises installing, over the base operating system, a first operating system layer corresponding to the first service, wherein the first operating system layer comprises operating system components associated with the first service, wherein the operating system components comprise at least one of: a driver, a configuration file, a priority, an interrupt protocol, or a user interface task.

13. The system of claim 8, wherein the set of triggering events further comprises at least one of: receiving a user request, receiving a network notification, or an expiration of a specified time period.

14. A non-transitory computer-readable media storing instructions that, when executed, cause a processing device to perform operations comprising:
booting, on a first device, a primary operating system using a primary operating system image residing in a first disk partition, wherein the primary operating system comprises a base operating system, wherein the primary operating system provides a first service;
booting, in parallel to booting the primary operating system, a secondary operating system using a secondary operating system image residing in a second disk partition, wherein the secondary operating system comprises a copy of the base operating system, wherein the secondary operating system provides the first service and a second service; and responsive to a detection of at last one triggering event of a set of triggering events, switching from the primary operating system to the secondary operating system, wherein the set of triggering events comprises at least one of: satisfying a condition associated with the first service provided by the primary operating system and the secondary operating system, or detection of a presence on a network of a second device, wherein the first device is connected to the network.

15. The non-transitory computer-readable media of claim 14, wherein switching from the primary operating system to the secondary operating system comprises:

offloading, to the secondary operating system, at least one of: a client request, a thread context, a data item, a metadata item, a software module, or a task associated with the primary operating system;

enabling user access to the first service and to the second service provided by the secondary operating system; and stopping operation of the primary operating system.

16. The non-transitory computer-readable media of claim 14, further comprising:

responsive to switching from the primary operating system to the secondary operating system, releasing one or more resources associated with the primary operating system.

17. The non-transitory computer-readable media of claim 14, further comprising:

responsive to a second triggering event, providing a third service by the primary operating system before switching from the primary operating system to the secondary operating system.

18. The non-transitory computer-readable media of claim 14, wherein the first service is identified based on at least one of: a priority associated with the first service or a flag associated with the first service.

19. The non-transitory computer-readable media of claim 14, wherein providing the first service comprises installing, over the base operating system, a first operating system layer corresponding to the first service, wherein the first operating system layer comprises operating system components associated with the first service, wherein the operating system components comprise at least one of: a driver, a configuration file, a priority, an interrupt protocol, or a user interface task.

20. The non-transitory computer-readable media of claim 14, wherein the set of triggering events further comprises at least one of: receiving a user request, receiving a network notification, or an expiration of a specified time period.

* * * * *